C. SCHWINGER.
FISH EXCLUDER OR GUARD.
APPLICATION FILED APR. 16, 1917.
1,266,331.
Patented May 14, 1918.
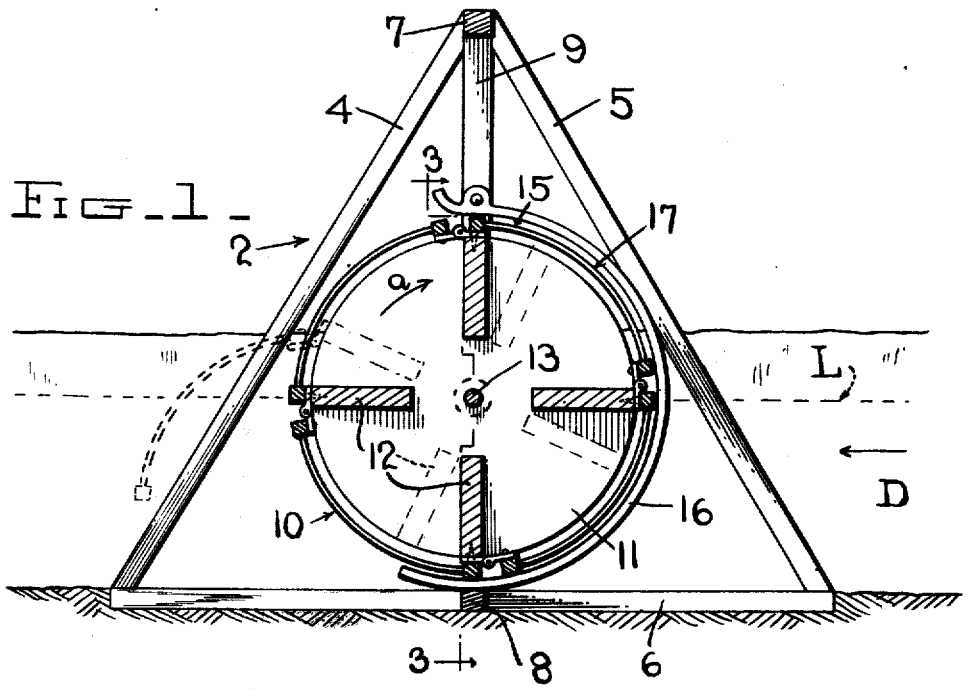
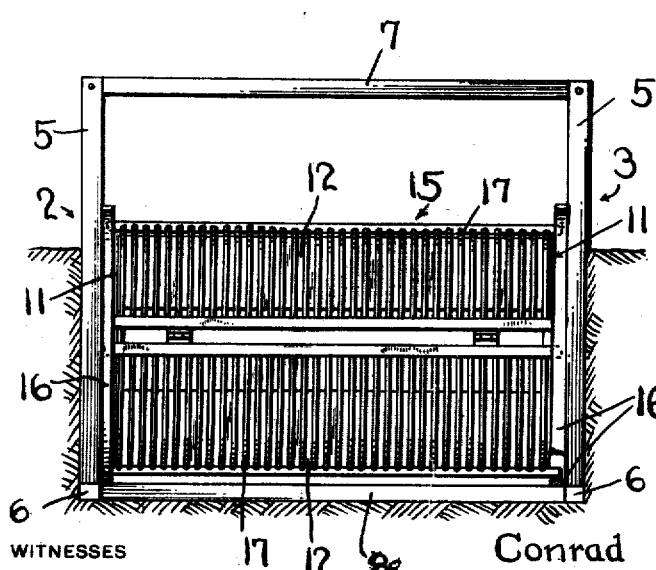
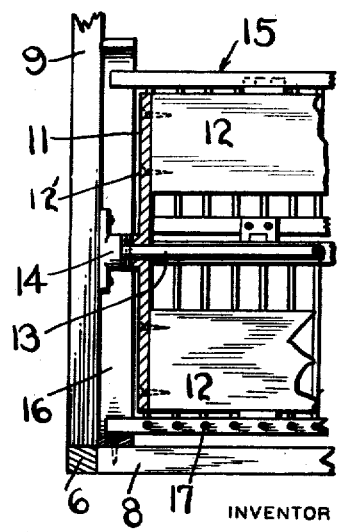
WITNESSES
L. B. James
S. M. McColl
INVENTOR
Conrad Schwinger
BY
ATTORNEY

UNITED STATES PATENT OFFICE.

CONRAD SCHWINGER, OF PARKER, SOUTH DAKOTA.

FISH EXCLUDER OR GUARD.

1,266,331.  Specification of Letters Patent.  Patented May 14, 1918.

Application filed April 16, 1917. Serial No. 162,407.

*To all whom it may concern:*

Be it known that I, CONRAD SCHWINGER, a citizen of the United States, residing at Parker, in the county of Turner and State of South Dakota, have invented certain new and useful Improvements in Fish Excluders or Guards, of which the following is a specification.

This invention relates to improvements in water gates and more particularly to that form of gate known as a fish excluder or guard.

The main object of the invention is to provide a gate of this character which may be effectively employed in a sluice, irrigating ditch or other waterway to prevent trout, or other fish from passing to the water beyond the guard.

Another object is to provide a gate of this character which is so constructed as to be self cleaning and thereby prevent clogging.

Another object is to provide a gate of this character having outwardly opening sections which are held in closed position until the gate passes a predetermined point in its rotation.

The present invention also contemplates the provision of a device as above described which shall be simple, substantial and inexpensive in construction as well as practical and efficient in operation.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a transverse section of a water gate constructed in accordance with this invention.

Fig. 2 is a front elevation thereof, and

Fig. 3 is a detail longitudinal section taken on the line 3—3 of Fig. 1.

In the embodiment illustrated, an irrigating ditch D is shown from which the fish are to be excluded beyond the point at which the excluder constituting this invention is positioned.

This excluder comprises a supporting structure in the form of a skeleton frame composed of A-shaped end members 2 and 3, the side bars 4 and 5 of which are connected at their lower ends by cross bars 6. These end members 2 and 3 are connected at their apices by a longitudinally extending bar 7 which is arranged transversely of the ditch D and is of a length substantially equal to the width of the ditch so that when the frame is positioned in the ditch, the end members thereof will closely engage the sides of the ditch to prevent all possibility of the fish passing between said end members and said sides.

A bar 8 connects the cross bars 6 of the two end members as shown clearly in Figs. 1 and 2 and an upright 9 extends from the apex of each end member to its cross bar 6 and is secured thereto midway the length thereof. Mounted to revolve in this frame is a skeleton drum 10 composed of circular end members as 11 which are connected by blades 12 secured thereto by screws 12' which extend from the peripheries of said end members 11 inward for about one quarter of the diameter of said end members. These blades are designed to operate in the same manner as the ordinary blades of a water wheel to cause the rotation thereof by the impinging of the water against these blades. A shaft 13 extends centrally from the end members 11 and longitudinally through the drum and is journaled at its opposite ends in bearings as 14 carried by the uprights 9 at opposite ends of the frame.

To the outer edge of each of the blades 12 is hingedly connected an arcuate vane or wing 15, four of which are here shown and which, when assembled are arranged concentrically with the ends of the drum as is shown clearly in Fig. 1, thus forming a peripheral closure for the drum throughout its entire length. These vanes or wings 15 are of a width sufficient to cause their free ends to overlap the next adjacent blade 12 so that when in closed position said free ends will rest on said blades and be prevented from passing into the drum when pressure is exerted thereon, such as will occur by the fish or other objects in the stream bearing against the drum. It will thus be seen that these blades limit the inward movement of the vanes 15 to permit them to swing freely outward when the drum is rotated. To prevent this outward swinging on the upstream side of the gate, which if permitted, would allow the fish to pass freely by the guard, suitable guides 16 are mounted on the end members 2 and 3 of the frame as is shown clearly in Fig. 2.

The combined guide and vane closing devices are shown in the form of compound curves and constructed of bars of suitable strength to withstand the strains brought to bear thereon by the pressure of the vanes. These guides 16 are secured at one end to the side bars 5 of the A-shaped end member of the frame at points above the normal water level of the ditch as is shown clearly in Fig. 1 and their lower ends are secured to the longitudinally disposed bars 8, the curvature of said guides conforming to the curvature of the vanes and to the periphery of the ends of the drum 10 so that when the drum is turned the free ends of the vanes will enter the space between the guides 16 and the drum and be held by said guides against outward opening until they reach a point beyond the down stream end of said guides 16, and when they have reached this point, they may swing outwardly into the dotted line position shown in Fig. 1 and thus permit any refuse lodging within the drum to pass out into the water below the gate.

The vanes 15 are here shown composed of frames having arcuate wires 17 spaced any suitable or desired distance apart according to the size of the fish which it is desired to exclude. While these vanes are shown composed of wires, it is to be understood that they may be composed of any other suitable material provided they are sufficiently reticulated to permit the passage of water therethrough.

In the operation of this excluder, the frame is positioned in the ditch with the end members closely engaging the side walls thereof and the cross bars 6 and connecting bars 8 embodied in the bottom of the ditch so as to dispose the drum with its periphery at its lowest extremity spaced slightly from the bottom of the ditch. This drum is rotated with the current of the stream by the water impinging against the blades 12 causing it to turn in the direction of the arrow *a*. When this drum is so revolved the vanes 15 on the upstream side will drop into closed position as shown in Fig. 1 and be held in this position by the guides 16 during the turning of the drum through the water in the ditch so that any fish which may be in the ditch and may endeavor to pass this drum will find their passage obstructed and yet the water will be permitted to pass freely through the ditch. After the drum has rotated a sufficient distance to cause its vanes or wings to pass beyond the down stream end of the guide 16, these vanes will swing outward under the action of the current of water and permit all debris which may have entered through the interstices of the vanes to pass freely out and the drum may be thereby cleaned, the continued rotation causing the vanes to drop back into closed position as will be obvious.

In a gate of this character, it is preferable that it be constructed about twice as high as the normal water level in the ditch, the level being herein shown at L in Fig. 1 and which is about half as high as the diameter of drum 10. This is to insure the prevention of the fish passing over the drum.

The apparatus will thus be automatically cleaned to prevent clogging, it being apparent from the foregoing taken in connection with the drawings that the other objects desired are carried out satisfactorily.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:—

1. The combination of a supporting structure to fit transversely across a ditch to be guarded, a skeleton drum having an axle mounted to rotate in said structure and composed of solid circular end members, blades connecting said end members and extending from their peripheries inward, an arcuate reticulated vane hinged at one edge to each blade with its free edge lapping the next blade, semi-circular vane guide and closing devices carried by said structure in front of and in close proximity to said drum, being concentric therewith whereby the vanes at the front of the drum are held closed throughout half the circumference of the drum during the downward movement of the vanes on the forward turning of the drum, and which permit them to open after the drum passes the bottom of the ditch.

2. In a device of the class described, a skeleton drum adapted to be partially submerged in a stream, arcuate screens pivoted at one edge to the periphery thereof to open outwardly on the upward turning of the drum, means for holding said screens out of contact with the bottom of the stream, and means for rotating the drum against the current of the stream.

3. In a device of the class described, a skeleton drum, screens pivoted to the periphery thereof with their edges arranged in proximity when closed, and guides coöperating with the successive screens to close them and hold them closed during their descent, said guides being positioned to permit the screens to open upwardly and outwardly after passing the bottom of the stream.

4. In a device of the class described, a skeleton drum, arcuate screens pivoted at one edge to the periphery thereof, and semicircular guides coöperable with the screens to successively swing the screens against the periphery of the drum during their descent.

In testimony whereof I affix my signature in presence of two witnesses.

CONRAD SCHWINGER.

Witnesses:
F. A. MUNSON,
RODNEY HILL.